United States Patent
Itagaki et al.

(10) Patent No.: US 7,710,681 B2
(45) Date of Patent: May 4, 2010

(54) OPTIMIZING TAPE SPEED FOR A SYNC OPERATION

(75) Inventors: Hiroshi Itagaki, Yokohama (JP); James Mitchell Karp, Tucson, AZ (US); Takashi Katagiri, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 370 days.

(21) Appl. No.: 11/759,161

(22) Filed: Jun. 6, 2007

(65) Prior Publication Data

US 2008/0304174 A1    Dec. 11, 2008

(51) Int. Cl.
*G11B 15/46* (2006.01)

(52) U.S. Cl. .................................... 360/73.01

(58) Field of Classification Search ............. 360/73.01, 360/73.02, 69, 51, 73.08, 72.1, 72.2
See application file for complete search history.

(56) References Cited

U.S. PATENT DOCUMENTS

| | | | | | |
|---|---|---|---|---|---|
| 3,157,867 | A | * | 11/1964 | Burns ........................... | 360/51 |
| 3,812,475 | A | * | 5/1974 | Christiansen et al. .......... | 710/7 |
| 4,302,785 | A | * | 11/1981 | Mussatt ...................... | 360/72.1 |
| 4,400,745 | A | * | 8/1983 | Shu ......................... | 360/73.08 |
| 4,675,757 | A | * | 6/1987 | Block ....................... | 360/72.2 |
| 4,763,203 | A | * | 8/1988 | Oldershaw et al. ............ | 386/20 |
| 5,019,906 | A | * | 5/1991 | Wesolowski ................ | 348/497 |
| 5,223,987 | A | * | 6/1993 | Muller ........................ | 386/77 |
| 5,465,240 | A | * | 11/1995 | Mankovitz .................... | 369/1 |
| 6,609,114 | B1 | * | 8/2003 | Gressel et al. ................ | 705/50 |
| 6,958,878 | B2 | | 10/2005 | Jaquette et al. | |
| 2007/0026371 | A1 | * | 2/2007 | Wood ........................ | 434/317 |
| 2009/0063763 | A1 | | 3/2009 | Katagiri | |

FOREIGN PATENT DOCUMENTS

| | | |
|---|---|---|
| JP | 10-199071 | 7/1998 |
| JP | 2006-318571 | 11/2006 |

OTHER PUBLICATIONS

English Abstract and Translation of Japanese Publication No. 10-199071 published Jul. 31, 1998, 11 pp.
English Abstract and Translation of Japanese Publication No. 2006-318571 published Nov. 24, 2006, 22 pp.

\* cited by examiner

*Primary Examiner*—Fred Tzeng
(74) *Attorney, Agent, or Firm*—Janaki K. Davda; Konrad Raynes & Victor LLP

(57) ABSTRACT

Provided are techniques for determining a tape speed for a next sync operation. A sync command is received. An average transaction size and an average host transfer rate of a set of previous sync operations are calculated. The tape speed for the next sync operation is determined using the average transaction size, the average host transfer rate, and a backhitch time. Data is written to a tape cartridge using the determined tape speed.

30 Claims, 15 Drawing Sheets

| Speed [m/sec] | Xfer rate (Media) [MB/sec] | BackHitch_Time [sec] | Transaction Size = 32 MB | Transaction Size = 64 MB | Transaction Size = 128 MB | Transaction Size = 256 MB | Transaction Size = 512 MB |
|---|---|---|---|---|---|---|---|
| 5.445 m/sec | 80 MB/sec | 2.182 sec | 2.582 sec | 2.982 sec | 3.782 sec | 5.382 sec | 8.582 sec |
| 4.773 m/sec | 70 MB/sec | 1.9092 sec | 2.366342857 sec | 2.823485714 sec | 3.737771429 sec | 5.566342857 sec | 9.223485714 sec |
| 4.092 m/sec | 60 MB/sec | 1.6368 sec | 2.170133333 sec | 2.703466667 sec | 3.770133333 sec | 5.903466667 sec | 10.17013333 sec |
| 3.41 m/sec | 50 MB/sec | 1.364 sec | 2.004 sec | 2.644 sec | 3.924 sec | 6.484 sec | 11.604 sec |
| 2.728 m/sec | 40 MB/sec | 1.0912 sec | 1.8912 sec | 2.6912 sec | 4.2912 sec | 7.4912 sec | 13.8912 sec |
| 2.046 m/sec | 30 MB/sec | 0.8184 sec | 1.885066667 sec | 2.951733333 sec | 5.085066667 sec | 9.351733333 sec | 17.88506667 sec |

FIG. 3
PRIOR ART

| Xfer rate (Host) [MB/sec] | Transaction Size = 32 MB | Transaction Size = 64 MB | Transaction Size = 128 MB | Transaction Size = 256 MB | Transaction Size = 512 MB |
|---|---|---|---|---|---|
| 80 MB/sec | 0.4 sec | 0.8 sec | 1.6 sec | 3.2 sec | 6.4 sec |
| 70 MB/sec | 0.457142857 sec | 0.914285714 sec | 1.828571429 sec | 3.657142857 sec | 7.314285714 sec |
| 60 MB/sec | 0.533333333 sec | 1.066666667 sec | 2.133333333 sec | 4.266666667 sec | 8.533333333 sec |
| 50 MB/sec | 0.64 sec | 1.28 sec | 2.56 sec | 5.12 sec | 10.24 sec |
| 40 MB/sec | 0.8 sec | 1.6 sec | 3.2 sec | 6.4 sec | 12.8 sec |
| 30 MB/sec | 1.066666667 sec | 2.133333333 sec | 4.266666667 sec | 8.533333333 sec | 17.06666667 sec |

VALUES OF "S" FOR A GIVEN HOST TRANSFER RATE AND TRANSACTION SIZE.

FIG. 9

| Speed (m/sec) | Transaction Size = 32MB | Transaction Size = 64MB | Transaction Size = 128MB | Transaction Size = 256MB | Transaction Size = 512MB |
|---|---|---|---|---|---|
| SP1 = 5.455 m/sec | 2.582 sec | 2.982 sec | 3.782 sec | 5.382 sec | 8.582 sec |
| SP2 = 4.773 m/sec | 2.366342857 sec | 2.823485714 sec | 3.737771429 sec | 5.566342857 sec | 9.223485714 sec |
| SP3 = 4.092 m/sec | 2.170133333 sec | 2.703466667 sec | 3.770133333 sec | 5.903466667 sec | 10.17013333 sec |
| SP4 = 3.410 m/sec | 2.004 sec | 2.644 sec | 3.924 sec | 6.484 sec | 11.604 sec |
| SP5 = 2.728 m/sec | 1.8912 sec | 2.6912 sec | 4.2912 sec | 7.4912 sec | 13.8912 sec |
| SP6 = 2.046 m/sec | 1.885066667 sec | 2.951733333 sec | 5.085066667 sec | 9.351733333 sec | 17.88506667 sec |

VALUES OF "T" FOR A GIVEN SPEED AND TRANSACTION SIZE.

FIG. 10

| Xfer rate (Host) [MB/sec] | Transaction Size = 32MB | Transaction Size = 64MB | Transaction Size = 128MB | Transaction Size = 256MB | Transaction Size = 512MB |
|---|---|---|---|---|---|
| 80 MB/sec | SP6 | SP4 | SP2 | SP1 | SP1 |
| 70 MB/sec | SP6 | SP4 | SP2 | SP1 | SP1 |
| 60 MB/sec | SP6 | SP4 | SP2 | SP1 | SP1 |
| 50 MB/sec | SP6 | SP4 | SP2 | SP1 | SP4 |
| 40 MB/sec | SP6 | SP4 | SP2 | SP4 | SP5 |
| 30 MB/sec | SP6 | SP4 | SP5 | SP6 | SP6 |

VALUES OF "Z" FOR A GIVEN HOST TRANSFER
RATE AND TRANSACTION SIZE,
WHERE Z IS COMPUTED USING VALUES OF S AND T

FIG. 11

| Xfer rate (Host) [MB/sec] | Transaction_Size = 32MB | Transaction_Size = 64MB | Transaction_Size = 128MB | Transaction_Size = 256MB | Transaction_Size = 512MB |
|---|---|---|---|---|---|
| 80 MB/sec | 16.97552695 MB/sec | 24.20574887 MB/sec | 34.24500466 MB/sec | 47.56596061 MB/sec | 59.65975297 MB/sec |
| 70 MB/sec | 16.97552695 MB/sec | 24.20574887 MB/sec | 34.24500466 MB/sec | 47.56596061 MB/sec | 59.65975297 MB/sec |
| 60 MB/sec | 16.97552695 MB/sec | 24.20574887 MB/sec | 34.24500466 MB/sec | 47.56596061 MB/sec | 59.65975297 MB/sec |
| 50 MB/sec | 16.97552695 MB/sec | 24.20574887 MB/sec | 34.24500466 MB/sec | 47.56596061 MB/sec | 44.1227163 MB/sec |
| 40 MB/sec | 16.97552695 MB/sec | 24.20574887 MB/sec | 34.24500466 MB/sec | 39.48180136 MB/sec | 36.85786685 MB/sec |
| 30 MB/sec | 16.97552695 MB/sec | 24.20574887 MB/sec | 29.8284862 MB/sec | 27.37460435 MB/sec | 28.62723464 MB/sec |

EXPECTED HOST TRANSFER RATE

FIG. 12

| Xfer rate (Host) [MB/sec] | Transaction_Size = 32MB | Transaction_Size = 64MB | Transaction_Size = 128MB | Transaction_Size = 256MB | Transaction_Size = 512MB |
|---|---|---|---|---|---|
| 80 MB/sec | 12.39349342 MB/sec | 21.46210597 MB/sec | 33.84452671 MB/sec | 47.56596061 MB/sec | 59.65975297 MB/sec |
| 70 MB/sec | 13.52297699 MB/sec | 22.66701747 MB/sec | 34.24500466 MB/sec | 45.9906992 MB/sec | 55.51046707 MB/sec |
| 60 MB/sec | 14.74563775 MB/sec | 23.67330834 MB/sec | 33.61977574 MB/sec | 43.36435089 MB/sec | 50.34348943 MB/sec |
| 50 MB/sec | 15.96806387 MB/sec | 24.20574887 MB/sec | 29.8284862 MB/sec | 39.48180136 MB/sec | 44.1227163 MB/sec |
| 40 MB/sec | 16.92047377 MB/sec | 23.78121284 MB/sec | 34.24500466 MB/sec | 34.17343016 MB/sec | 36.85786685 MB/sec |
| 30 MB/sec | 16.97552695 MB/sec | 21.68217544 MB/sec | 25.17174472 MB/sec | 27.37460435 MB/sec | 28.62723464 MB/sec |

EXPECTED HOST TRANSFER RATE

FIG. 13

OPTIMIZING TAPE SPEED FOR A SYNC OPERATION

BACKGROUND

1. Field

Embodiments of the invention relate to optimizing tape speed for a sync operation.

2. Description of the Related Art

A host computer may be coupled to a tape drive. The host computer includes cache and executes a host application. The tape drive has tape cartridges for storing data.

Some commands that are received at the tape drive from the host force a sync operation, (e.g., WriteFM 0 non-immediate), and such commands may be referred to as sync commands. Also, sync operations may be performed as a result of a sync command or for other reasons implicitly by the tape drive. Thus, a sync operation may be described as the actual action of the tape drive synchronizing all the data in a data buffer to a tape cartridge. In particular, the tape drive has a data buffer. The host computer sends data in its data buffer to the tape drive, and this data is stored in the data buffer at the tape drive. The sync operation writes the data in the tape drive data buffer onto a tape cartridge.

A sync command (e.g., a WriteFM 0) may be issued to write data from the data buffer (e.g., in cache) to a tape cartridge. In particular, the host application at the host system issues the sync command, and, in response to receiving the sync command, the tape drive writes data in the data buffer of the tape drive to a tape cartridge (i.e., performs the sync operation). Then, the tape drive starts a backhitch motion. Reading from and writing to a tape cartridge occurs in a forward direction, while "backhitch" refers to the tape cartridge moving in a reverse direction.

Writing to a tape cartridge may be described as follows:

1. Write with Speed Sa to Position X (where Sa is a current speed).

2. Decelerate and move to Position Y (which is past position X in a forward direction).

3. Move backward (i.e., in reverse) to Position Z to have enough distance to accelerate to Speed Sb (where Sb is a new speed).

4. Accelerate to Speed Sb.

FIG. 1 illustrates a graph 100 of position versus velocity. The values of Y and Z in graph 100 are calculated using Equations 1 and 2 (below). A backhitch motion typically takes a few seconds. The backhitch time is calculated with speed Sa, speed Sb, and accelerated velocity "A" using Equations 1-3.

$$Y = Sa^2/(2*A) \quad \text{Equation 1}$$

$$Z = Sb^2/(2*A) \quad \text{Equation 2}$$

$$Backhitch\_Time(Sa,Sb) = Sa/A + \sqrt{(2*(Y-Z)/A)} + Sb/A \quad \text{Equation 3}$$

The Backhitch_Time may be described as representing an amount of time to perform the backhitch motion. Because the tape drive cannot write the received data in backhitch motion, the backhitch motion causes a performance penalty if the host application issues many sync commands. The time that the tape drive takes to perform the sync operation is given in Equation 4.

$$Time\_of\_Sync\_Operation = Backhitch\_Time(Sa,Sb) + Time\_to\_Write\_Data \quad \text{Equation 4}$$

FIG. 2 illustrates a graph 200 of time versus velocity. As can be seen in graph 200, the backhitch operation has a decreased velocity followed by an increased velocity over time.

FIG. 3 illustrates a table 300 of approximate times of sync operations (shown under the transaction size columns) based on given speeds, transfer rates, backhitch time, and various transaction sizes. Assuming that the tape drive has 6 speeds and acceleration is 10 m/sec$^2$ (where m represents meters and sec represents seconds), then the maximum transfer rate to write the data to tape is 80 MB/sec (where MB represents megabytes).

The transaction size may be described as the size of data that the host transfers between issuing the sync commands. If the transaction size is small, the slower speed is preferred over the faster speed. For example, if the transaction size is 32 MB, the preferred speed is 2.046 m/sec (where m represents meters and sec represents seconds). In table 300, the values under the Backhitch_Hitch column are calculated using Equation 3, while the values under the transaction size columns are calculated using Equation 4. From Table 300, it can be seen that it is better to select a slower speed if a transaction size is small (e.g., for a transaction size of 32 MB, the smallest time of sync operation is 1.885066667 seconds at speed 2.046 m/sec).

If the transaction size is not small, there are two problems to address. With the first problem, when the tape drive is doing a backhitch, the tape drive does not know whether the host will issue another sync command or not. Therefore, the tape drive does not select an optimal tape speed for the next sync operation at this time. Instead, the tape drive selects a speed based on the host transfer rate. If the host transfer rate is fast, the tape drive selects the faster speed, even though the tape drive should select the slower speed. Again, with reference to Table 300, for a transaction size of 32 MB, the smallest time of sync operation is 1.885066667 seconds at speed 2.046 m/sec, so the slower speed should be selected, but the tape drive may instead select a speed of 5.455 m/sec based on the host transfer rate of 80 MB/sec.

One solution to the first problem is for the tape drive to wait to write until a sync command is received. If the tape drive waits to write (e.g., to check whether the host might issue the sync command later) until the sync command is received, the waiting time leads to poor performance. In addition, the host might not issue a sync command after the backhitch operation, so the tape drive would not know how long to wait for the next sync command. FIG. 4 illustrates a graph 400 of time versus velocity that shows waiting time for a sync operation.

In addition to a backhitch occurring after a sync command is received, a backhitch may occur when the tape drive buffer becomes empty. With the second problem, if the host transfer rate is slow, the backhitch happens in the middle of a write operation before the sync command because the buffer in the tape drive becomes empty in the middle of the write operation. Due to this backhitch, the overall write and sync operation takes longer. FIG. 5 illustrates a graph 500 of time versus velocity and the impact of a buffer empty condition in the middle of a sync operation scenario.

Thus, there is a need in the art for optimizing tape speed for a sync operation.

SUMMARY OF EMBODIMENTS OF THE INVENTION

Provided are a method, computer program product, and system for determining a tape speed for a next sync operation. A sync command is received. An average transaction size and an average host transfer rate of a set of previous sync operations are calculated. The tape speed for the next sync operation is determined using the average transaction size, the average host transfer rate, and a backhitch time. Data is written to a tape cartridge using the determined tape speed.

BRIEF DESCRIPTION OF THE DRAWINGS

Referring now to the drawings in which like reference numbers represent corresponding parts throughout:

FIG. 3 illustrates a table of approximate times of sync operations.

FIG. 9 illustrates a table of approximate values of "S" for a given host transfer rate and transaction size in accordance with certain embodiments.

FIG. 10 illustrates a table of approximate values of "T" for a given speed and transaction size in accordance with certain embodiments.

FIG. 11 illustrates a table of values of "Z" for a given host transfer rate and transaction size in accordance with certain embodiments, wherein the values of "Z" are determined using the processing of FIGS. 8A and 8B and using the values of "S" and "T".

FIG. 12 illustrates a table of expected host transfer rates.

FIG. 13 illustrates a table of transfer rates when speed is selected based on the expected host transfer rate.

DETAILED DESCRIPTION

In the following description, reference is made to the accompanying drawings which form a part hereof and which illustrate several embodiments of the invention. It is understood that other embodiments may be utilized and structural and operational changes may be made without departing from the scope of the invention.

Embodiments enable a tape drive to select an optimal tape speed for a sync operation while the tape drive is doing a backhitch, even though the tape drive does not know whether a sync command will be issued later if the transaction size is not small. Also, embodiments avoid having an extra backhitch occur in the middle of a sync operation if the host transfer rate is not fast. In particular, the tape drive monitors an average transaction size and an average host transfer rate. Using these two values, the tape drive selects an optimal tape speed for the sync operation. In certain embodiments, the optimal tape speed is determined while the tape drive is doing the backhitch.

Figure 1:
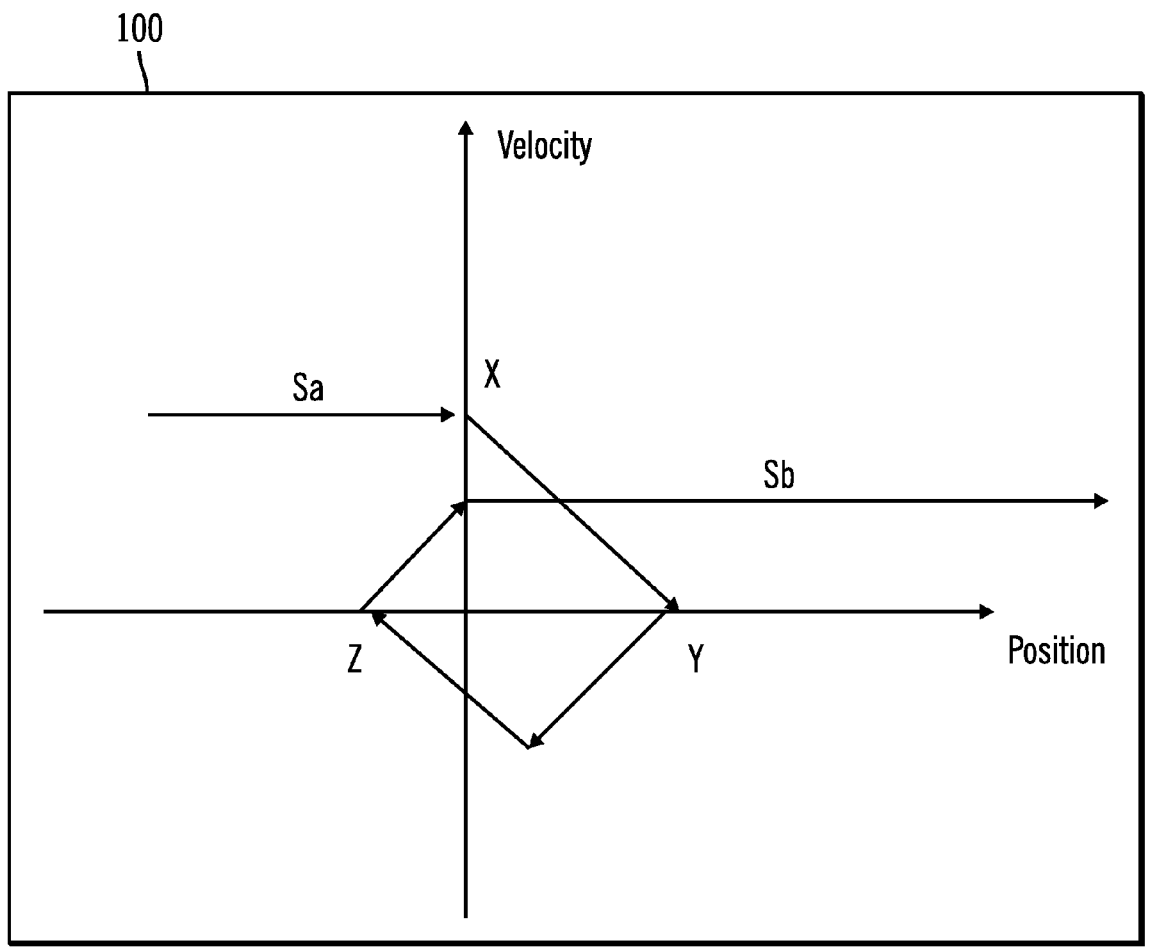
FIG. 1 illustrates a graph of position versus velocity.
Figure 2:
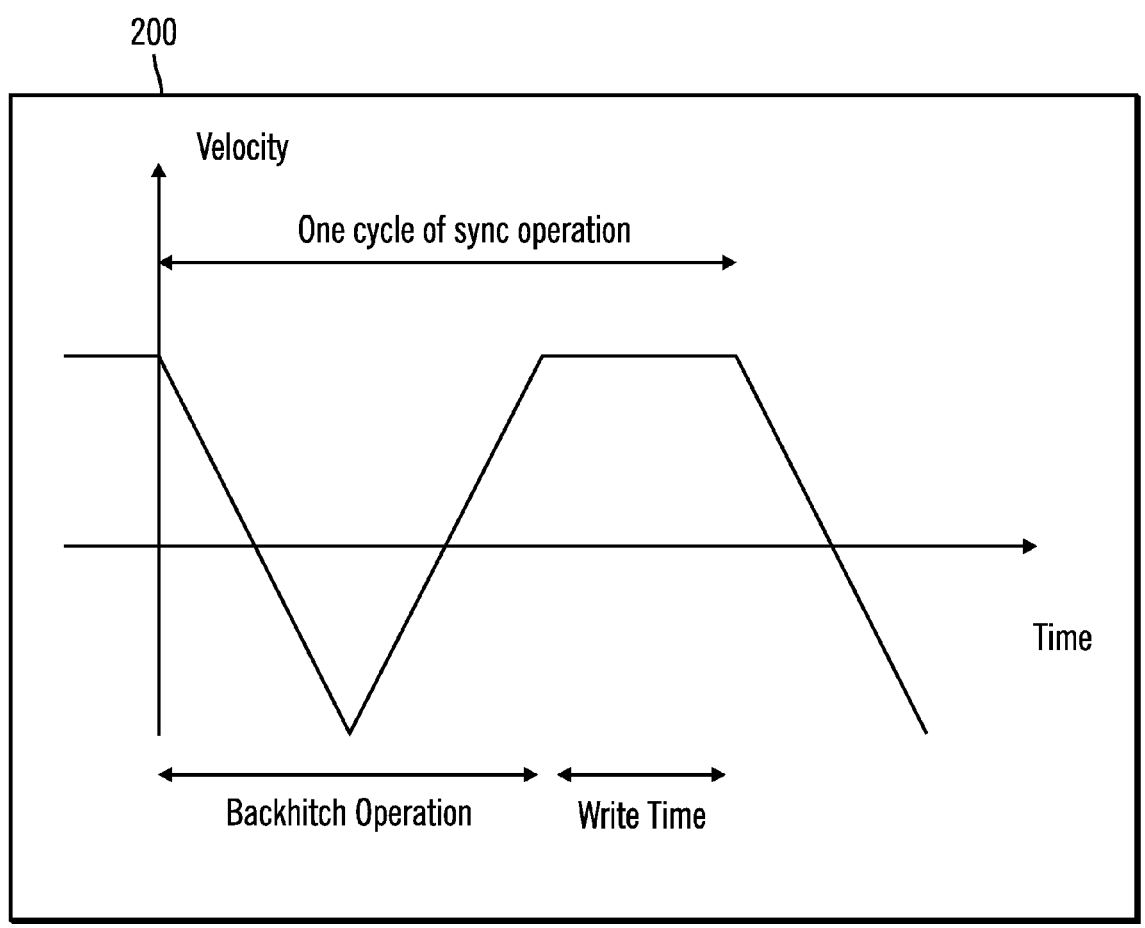
FIG. 2 illustrates a graph of time versus velocity.
Figure 4:
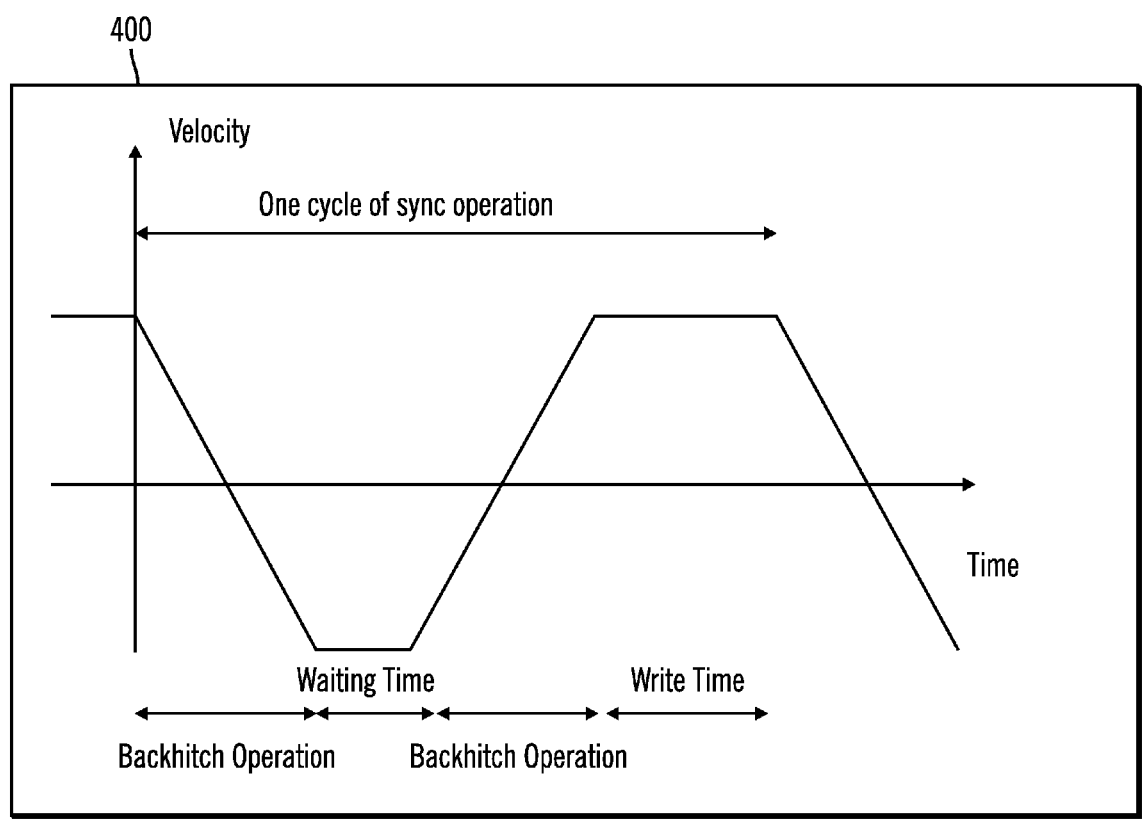
FIG. 4 illustrates a graph of time versus velocity that shows waiting time for a sync operation.
Figure 5:
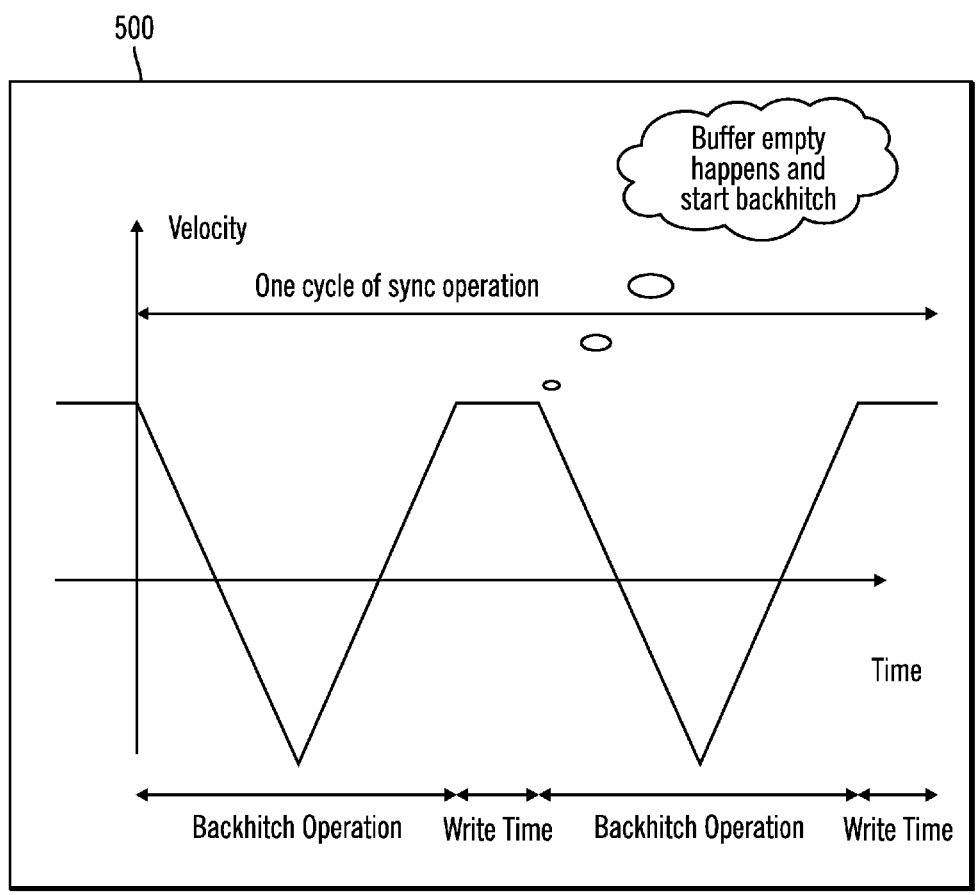
FIG. 5 illustrates a graph of time versus velocity and the impact of a buffer empty condition in the middle of a sync operation scenario.
Figure 6:
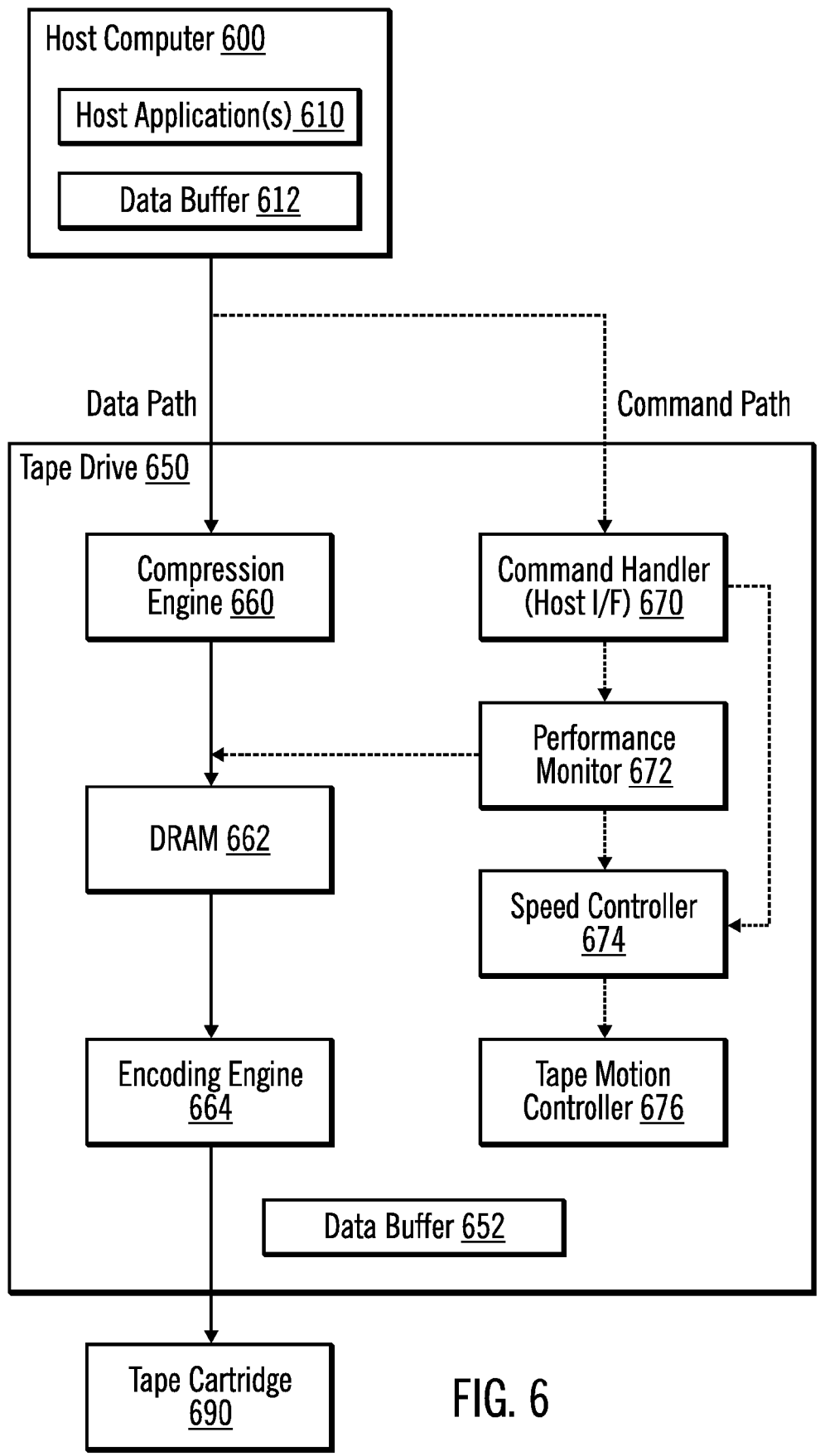
FIG. 6 illustrates, in a block diagram, a computing environment in accordance with certain embodiments.

FIG. 6 illustrates, in a block diagram, a computing environment in accordance with certain embodiments. A host computer 600 is coupled to a tape drive 650. Although the host computer 600 is shown as being directly coupled to the tape drive 650, in alternative embodiments, the host computer 600 may be coupled to a virtual tape server or storage controller that is coupled to the tape drive 650. The host computer 600 includes one or more host applications 610 and a data buffer 612.

The tape drive 650 includes a compression engine 660, a Dynamic Random Access Memory (DRAM), an encoding engine 664, a command handler (host Interface (I/F)) 670, a performance monitor 672, a speed controller 674, and a tape motion controller 676. The compression engine 660 compresses data, DRAM 662 stores data, and encoding engine 664 encodes the compressed data (e.g., to provide an error correcting code) before the data is stored on a tape cartridge 690 coupled to the tape drive 650.

The tape drive 650 includes a data buffer 652. Data received at the tape drive 650 from the data buffer 612 of the host computer 600 is stored into the data buffer 652. A sync operation copies data from the data buffer 652 to a tape cartridge 690.

In FIG. 6, the darker arrows represent a data path from the host computer 600 to the tape cartridge 690 via a compression engine 660, a DRAM 662, and an encoding engine 664. Also in FIG. 6, command paths are shown using dashed arrows (e.g., from host computer 600 to command handler (host I/F) 670).

Figure 7:
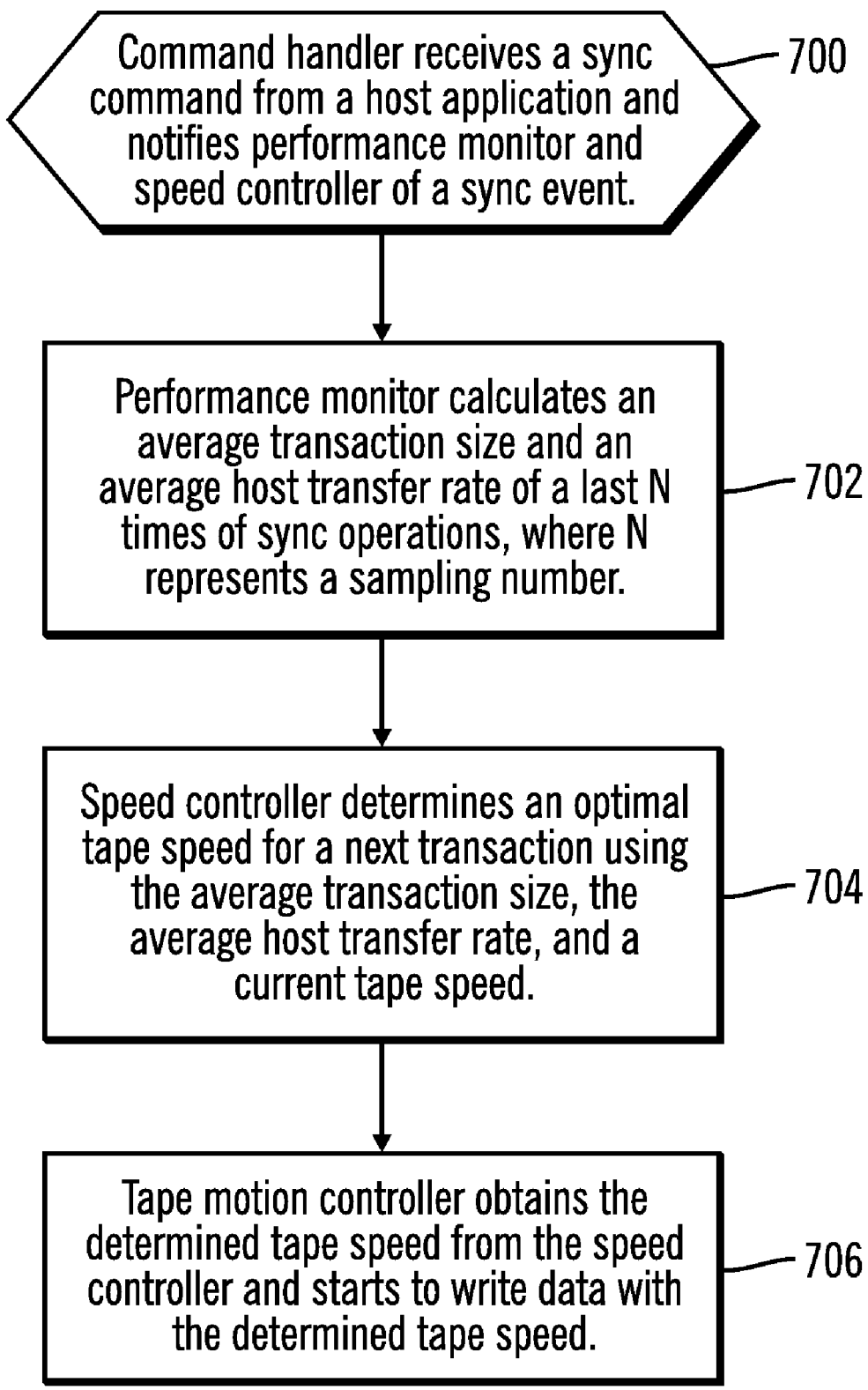
FIG. 7 illustrates logic performed by components of a tape drive in accordance with certain embodiments.

FIG. 7 illustrates logic performed by components 670, 672, 674, 676 of a tape drive 650 in accordance with certain embodiments. Control begins at block 700 with the command handler 670 receiving a sync command from a host application 610. In certain embodiments, the sync command is received while a backhitch is being performed, while in other embodiments, the sync command is received while a backhitch is not being performed. When the command handler 670 receives a sync command, the command handler 670 notifies the performance monitor 672 and speed controller 674 that the sync command has been received (i.e., notifies them of a sync event).

The performance monitor 672 monitors the transfer rate from the host computer 600 to DRAM 662. In block 702, when the sync event is received from the command handler 670, the performance monitor 672 calculates an average transaction size and an average host transfer rate of a last N times of sync operations, where N represents a sampling number. The last N times of sync operations may also be referred to as a "set of previous sync operations".

The speed controller 674 determines a tape speed at which a sync operation should be performed. In block 704, when the sync event is received from the command handler 670, the speed controller 674 determines an optimal tape speed for the next transaction using the average transaction size (calculated by the performance monitor 672), the average host transfer rate (calculated by the performance monitor 672), and a current tape speed.

In block 706, the tape motion controller 676 obtains the determined tape speed from the speed controller 674 and starts to write data with the determined tape speed.

Figure 8A:
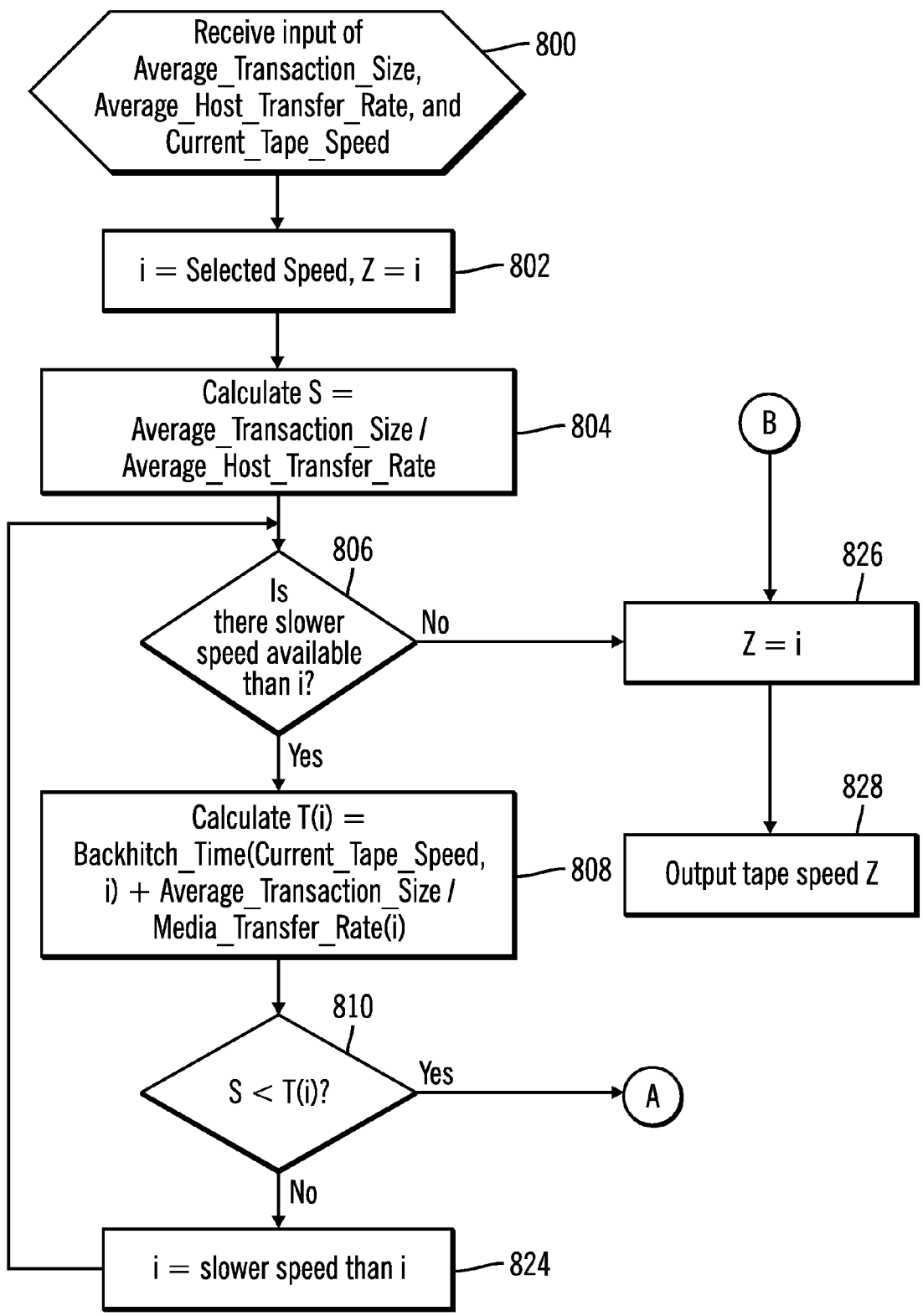
FIGS. 8A and 8B illustrate logic for determining an optimal tape speed for a sync operation in accordance with certain embodiments.
Figure 8B:
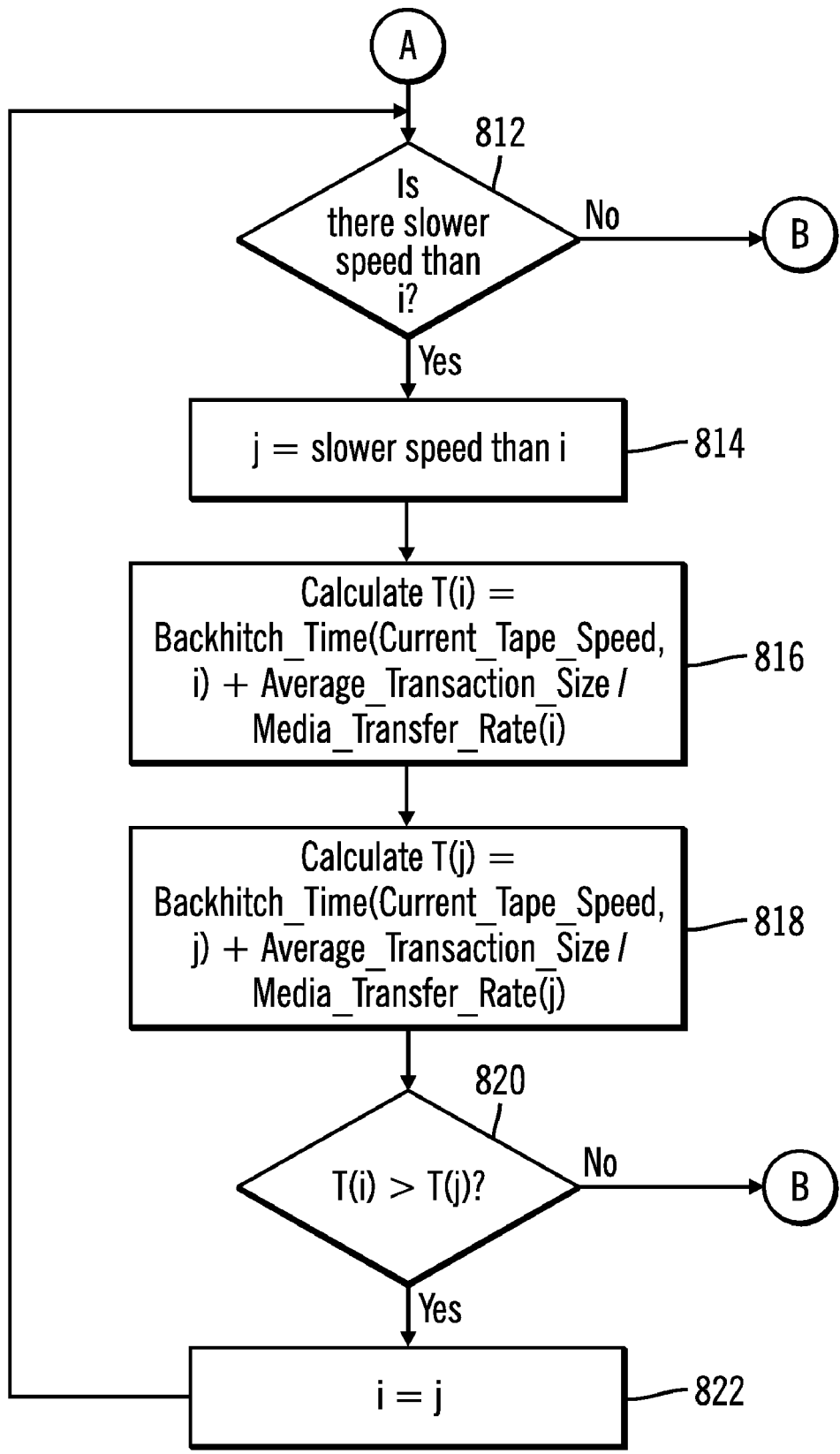

FIGS. 8A and 8B illustrate logic for determining an optimal tape speed for a sync operation in accordance with certain embodiments. The processing of FIGS. 8A and 8B occurs when a backhitch starts. Control begins at block 800 (FIG. 8A) with the speed controller 674 receiving input of an average transaction size (Average_Transaction_Size), an average host transfer rate (Average_Host_Transfer_Rate), and a current tape speed (Current_Tape_Speed).

In block 802, the speed controller 674 sets a variable "i" to a selected speed and sets a variable "Z" to the value of "i". In certain embodiments, the tape drive 650 is capable of writing data to the tape cartridge 690 at a number of predetermined speeds (e.g., 6 speeds), and "i" is set to the fastest speed among the predetermined speeds. In certain embodiments, the predetermined speeds are: 5.455 m/sec, 4.773 m/sec, 4.092 m/sec, 3.41 m/sec, 2.728 m/sec, 2.046 m/sec. However, embodiments are applicable to tape drives that do not just write using one of a predetermined number of speeds. For example, the logic of FIGS. 8A and 8B is applicable to tape drives that write with tape speeds from 2 m/sec-6 m/sec. That is, embodiments are applicable when the resolution of the tape speed "i" is changed (e.g., the tape speed may be 5.455 m/sec, 5.454 m/sec, 5.453 m/sec, etc.). Thus, in certain embodiments, the tape drive 650 supports continuous speeds, and so, if the tape drive 650 supports a continuous linear range of velocity, a computed optimum speed value is selected or a speed is selected from a plurality of speeds for "i".

In block 804, the speed controller 674 calculates a variable "S". The variable "S" is given by Equation 5:

$$S = \text{Average\_Transaction\_Size}/\text{Average\_Host\_Transfer\_Rate} \quad \text{Equation 5}$$

That is, the variable "S" represents an average transaction size divided by an average host transfer rate. The variable "S" may be described as representing an expected time to transfer data from a first source (e.g., the host computer 600) to the tape drive 650.

In block 806, the speed controller 674 determines whether there is a slower speed available than variable "i". If so, processing continues to block 808, otherwise, processing continues to block 826.

In block 808, the speed controller 674 calculates a variable "T(i)". The variable "T(i)" is given by Equation 6:

Equation 6:

$$T(i) = \text{Backhitch\_Time}(i) + \text{Time\_to\_Write\_Data}(i)$$
$$= \text{Backhitch\_Time}(i) + \frac{\text{Average\_Transaction\_Size}}{\text{Media\_Transfer\_Rate}(i)}$$

That is, the variable "T(i)" represents backhitch time for speed "i" plus the average transaction size divided by the media transfer rate for speed "i". The variable "T(i)" may be described as representing the expected time of a sync operation, which is given by a next speed and a current tape speed. When a sync operation is received, the current tape speed is known. Therefore, the backhitch time may be calculated (with Equation 7 described below). Also, the media transfer rate ("Media_Transfer_Rate") is determined by the tape speed and the density of the tape. For example, Table A represents approximate media transfer rates.

TABLE A

| Speed [m/sec] | Media Transfer Rate [MB/sec] |
|---|---|
| 5.455 | 80 |
| 4.773 | 70 |
| 4.092 | 60 |
| 3.41 | 50 |
| 2.728 | 40 |
| 2.046 | 30 |

The backhitch time for speed "i" is given by Equation 3 above (and repeated here for easy reference), where Sa is Current_Tape_Speed, Sb is i, A is acceleration, deceleration is to Position Y, and there is a backward move to position Z.

$$\text{Backhitch\_Time}(\text{Current\_Tape\_Speed}, i) = \text{Current\_Tape\_Speed}/A + \sqrt{(2*(Y-Z)/A)} + i/A$$

With reference to FIG. 8A, in block 810, the speed controller 674 determines whether the variable "S" is less than the variable "T(i)". If so, processing continues to block 812 (FIG. 8B), otherwise, processing continues to block 824 (FIG. 8A).

In block 824, the variable "i" is set to the slower speed than "i" and processing loops back to block 806.

In block 812 (FIG. 8B), the speed controller 674 determines whether there is a slower speed than "i". If so, processing continues to block 814, otherwise, processing continues to block 826 (FIG. 8A).

In block 814, the speed controller 674 sets a variable "j" to the slower speed than "i". In block 816, the speed controller 674 calculates T(i) with Equation 6. In block 818, the speed controller 674 calculates T(j). T(j) may be calculated using Equation 6, where "i" is replaced with "j". In block 820, the speed controller 674 determines whether T(i) is greater than (">") T(j). If so, processing continues to block 822, otherwise, processing continues to block 826 (FIG. 8A).

In block 822, the speed controller 674 sets variable "i" to "j" and processing loops back to block 812 (FIG. 8B).

With reference to FIG. 8A, in block 826, the speed controller 674 sets variable "Z" to "i". In block 828, the speed controller 674 outputs speed "Z", which represents an optimal tape speed for a sync operation. Then, the speed "Z" is the speed at which the tape drive 650 writes data onto the tape cartridge 690.

Blocks 806, 808, 810, 824, 286, 826 may be described as searching for a tape speed that is not too fast to cause a buffer empty condition in the middle of a sync operation. For example, when "S" is less than the variable "T(i)" (i.e., "S<T(i)"), the buffer empty condition occurs before the sync operation is completed and an extra backhitch occurs, which causes performance loss.

Blocks 812, 814, 816, 818, 820, 822, 826, 828 may be described as searching for a tape speed to reduce the backhitch impact.

With the processing of FIGS. 8A and 8B, an expected time to transfer data from a first source to a tape cartridge is determined (S<T(i)) one or more times, the expected time of a sync operation is determined one or more times (T(i) and T(j)), wherein each determination is based on a particular tape speed from a set of tape speeds, and the tape speed for the next sync operation is determined using the expected times to transfer data and the expected times of the sync operation.

FIG. 9 illustrates a table 900 of approximate values of "S" for a given host transfer rate and transaction size in accordance with certain embodiments. FIG. 10 illustrates a table 1000 of approximate values of "T" for a given speed and transaction size in accordance with certain embodiments. FIG. 11 illustrates a table 1100 of values of "Z" for a given host transfer rate and transaction size in accordance with certain embodiments, wherein the values of "Z" are determined using the processing of FIGS. 8A and 8B and using the values of "S" and "T".

For example, if the average host transfer rate is 80 MB/sec and the average transaction size is 32 MB, then "S" is 0.4 sec. If the average host transfer rate is 30 MB/sec, and the average transaction size is 32 MB, then "S" is about 1.06 sec.

Continuing with the example, if the current speed is 5.455 m/sec and the average transaction size is 32 MB, then "T" is 2.582 seconds. If the current speed is 2.046 m/sec and the transaction size is 32 MB, then "T" is about 1.88 seconds.

So, for an average host transfer rate of 80 MB/sec and a transaction size of 32 MB, embodiments select a speed of 2.046 m/sec (corresponding to "T" of about 1.88 seconds).

In conventional systems, an expected host transfer rate may be used to select a speed for a next sync operation. FIG. 12 illustrates a table 1200 of expected host transfer rates. FIG. 13 illustrates a table of transfer rates 1300 when speed is selected based on the expected host transfer rate. For example, if the host transfer rate is 60 MB/sec, speed 3 is selected.

As can be seen from table 1300, which represents a conventional technique, and table 1100, which represents speeds for a next sync operation in accordance with embodiments, embodiments provide an improved speed selection technique.

Thus, embodiments select a slower speed for smaller transactions and also avoid a buffer empty condition in the middle of a sync operation scenario.

Additional Embodiment Details

The described operations may be implemented as a method, computer program product or apparatus using standard programming and/or engineering techniques to produce software, firmware, hardware, or any combination thereof.

Each of the embodiments may take the form of an entirely hardware embodiment, an entirely software embodiment or an embodiment containing both hardware and software elements. The embodiments may be implemented in software, which includes but is not limited to firmware, resident software, microcode, etc.

Furthermore, the embodiments may take the form of a computer program product accessible from a computer-usable or computer-readable medium providing program code for use by or in connection with a computer or any instruction execution system. For the purposes of this description, a computer-usable or computer readable medium may be any apparatus that may contain, store, communicate, propagate, or transport the program for use by or in connection with the instruction execution system, apparatus, or device.

The described operations may be implemented as code maintained in a computer-usable or computer readable medium, where a processor may read and execute the code from the computer readable medium. The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a rigid magnetic disk, an optical disk, magnetic storage medium (e.g., hard disk drives, floppy disks, tape, etc.), volatile and non-volatile memory devices (e.g., a random access memory (RAM), DRAMs, SRAMs, a read-only memory (ROM), PROMs, EEPROMs, Flash Memory, firmware, programmable logic, etc.). Current examples of optical disks include compact disk-read only memory (CD-ROM), compact disk-read/write (CD-R/W) and DVD.

The code implementing the described operations may further be implemented in hardware logic (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a computer readable medium at the receiving and transmitting stations or devices.

A computer program product may comprise computer useable or computer readable media, hardware logic, and/or transmission signals in which code may be implemented. Of course, those skilled in the art will recognize that many modifications may be made to this configuration without departing from the scope of the embodiments, and that the computer program product may comprise any suitable information bearing medium known in the art.

The term logic may include, by way of example, software, hardware, firmware, and/or combinations of software and hardware.

Certain implementations may be directed to a method for deploying computing infrastructure by a person or automated processing integrating computer-readable code into a computing system, wherein the code in combination with the computing system is enabled to perform the operations of the described implementations.

The logic of FIGS. 7, 8A, and 8B describes specific operations occurring in a particular order. In alternative embodiments, certain of the logic operations may be performed in a different order, modified or removed. Moreover, operations may be added to the above described logic and still conform to the described embodiments. Further, operations described herein may occur sequentially or certain operations may be processed in parallel, or operations described as performed by a single process may be performed by distributed processes.

The illustrated logic of FIGS. 7, 8A, and 8B may be implemented in software, hardware, programmable and non-programmable gate array logic or in some combination of hardware, software, or gate array logic.

Figure 14:
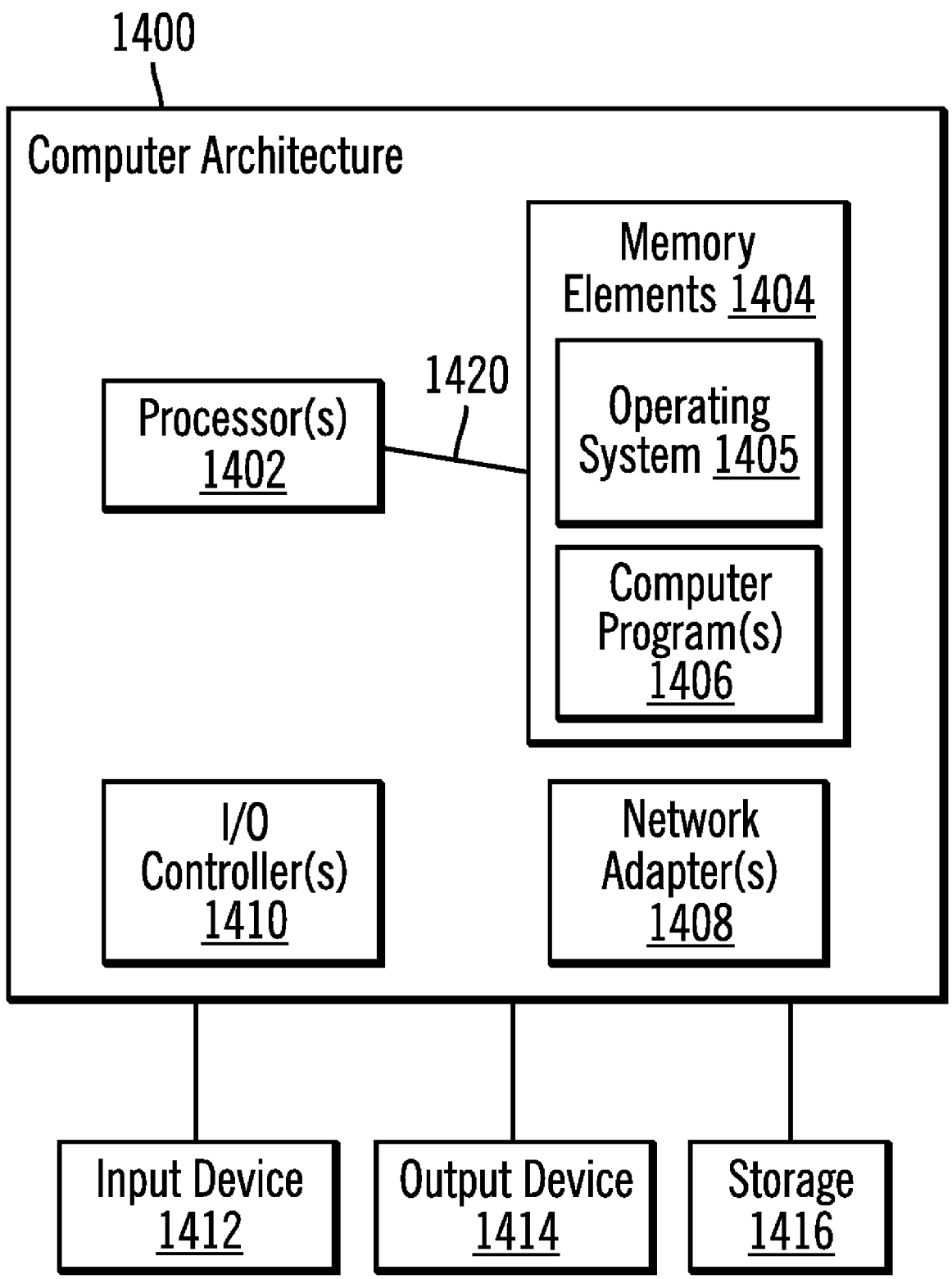
FIG. 14 illustrates a system architecture that may be used in accordance with certain embodiments.

FIG. 14 illustrates a system architecture 1400 that may be used in accordance with certain embodiments. Host computer 600 and/or tape drive 650 may implement system architecture 1400. The system architecture 1400 is suitable for storing and/or executing program code and includes at least one processor 1402 coupled directly or indirectly to memory elements 1404 through a system bus 1420. The memory elements 1404 may include local memory employed during actual execution of the program code, bulk storage, and cache memories which provide temporary storage of at least some program code in order to reduce the number of times code must be retrieved from bulk storage during execution. The memory elements 1404 include an operating system 1405 and one or more computer programs 1406.

Input/Output (I/O) devices 1412, 1414 (including but not limited to keyboards, displays, pointing devices, etc.) may be coupled to the system either directly or through intervening I/O controllers 1410.

Network adapters 1408 may also be coupled to the system to enable the data processing system to become coupled to other data processing systems or remote printers or storage devices through intervening private or public networks. Modems, cable modem and Ethernet cards are just a few of the currently available types of network adapters 1408.

The system architecture 1400 may be coupled to storage 1416 (e.g., a non-volatile storage area, such as magnetic disk drives, optical disk drives, a tape drive, etc.). The storage 1416 may comprise an internal storage device or an attached or network accessible storage. Computer programs 1406 in storage 1416 may be loaded into the memory elements 1404 and executed by a processor 1402 in a manner known in the art.

The system architecture 1400 may include fewer components than illustrated, additional components not illustrated herein, or some combination of the components illustrated and additional components. The system architecture 1400 may comprise any computing device known in the art, such as a mainframe, server, personal computer, workstation, laptop, handheld computer, telephony device, network appliance, virtualization device, storage controller, etc.

The foregoing description of embodiments of the invention has been presented for the purposes of illustration and description. It is not intended to be exhaustive or to limit the embodiments to the precise form disclosed. Many modifications and variations are possible in light of the above teaching. It is intended that the scope of the embodiments be limited not by this detailed description, but rather by the claims appended hereto. The above specification, examples and data provide a complete description of the manufacture and use of the composition of the embodiments. Since many embodiments may be made without departing from the spirit and scope of the embodiments, the embodiments reside in the claims hereinafter appended or any subsequently-filed claims, and their equivalents.

What is claimed is:

1. A computer-implemented method for determining a tape speed for a next sync operation, comprising:
   receiving a sync command that writes data in a tape drive data buffer onto a tape cartridge while a backhitch is being performed;
   calculating an average transaction size and an average host transfer rate of a set of previous sync operations;
   determining the tape speed for the next sync operation using the average transaction size, the average host transfer rate, and a backhitch time by calculating:

$T(i) = \text{Backhitch\_Time}(i) + \text{Average\_Transaction\_Size}/\text{Media\_Transfer\_Rate}(i)$, wherein the Media_Transfer_Rate(i) is determined based on a density of a tape; and
   writing data to a tape cartridge using the determined tape speed.

2. The method of claim 1, wherein determining the tape speed further comprises:
   determining an expected time to transfer data from a first source to the tape cartridge one or more times;
   determining an expected time of a sync operation one or more times, wherein each determination is based on a particular tape speed from a set of tape speeds; and
   wherein the tape speed is determined using the one or more determinations of the expected time to transfer data and the one or more determinations of the expected time of the sync operation.

3. The method of claim 1, wherein the determined tape speed avoids a buffer empty condition in a middle of the next sync operation.

4. The method of claim 3, wherein a slower speed is determined for smaller transactions.

5. A computer-implemented method for determining a tape speed for a sync operation, comprising:
   calculating a first variable "S" that represents an expected time to transfer data from a first source to a tape drive;
   calculating a second variable "T" that represents an expected time of a sync operation, wherein the second variable is dependent on a current tape speed and a third variable "i" that represents another tape speed by calculating:

$T(i) = \text{Backhitch\_Timed}) + \text{Average\_Transaction\_Size}/\text{Media\_Transfer\_Rated}(i)$, wherein the Backhitch_Timed) is dependent on the current tape speed and the third variable "i", and wherein the Media_Transfer_Rate is dependent on the third variable "i";
   in response to determining that a value of the first variable is greater than a value of the second variable,
      determining whether there is a slower speed available that is slower than a value of the third variable; and
      in response to determining that there is no slower speed, outputting the value of the third variable as the tape speed for the sync operation.

6. The method of claim 5, wherein calculating the first variable further comprises:
   dividing an average transaction size by an average host transfer rate.

7. The method of claim 5, further comprising:
   in response to determining that there is a slower speed,
      calculating a new value for the second variable; and
      comparing the new value to the value of the first variable.

8. The method of claim 5, further comprising:
   in response to determining that a value of the first variable is less than a value of the second variable,
      determining whether there is a slower speed available that is slower than a value of the third variable; and
      in response to determining that there is no slower speed, outputting the value of the third variable as the tape speed for the sync operation.

9. The method of claim 8, further comprising:
   in response to determining that there is a slower speed,
      setting a fourth variable "j" to a value of the slower speed;
      calculating a new first value for the second variable "T", wherein the second variable is dependent on a current value of the third variable "i";
      calculating a new second value for the second variable "T", wherein the second variable is dependent on the fourth variable "j";
      in response to determining that the new first value is less than the new second value, outputting the current value of the third variable as the tape speed for the sync operation.

10. A computer-implemented method for determining a tape speed for a sync operation, comprising:
    calculating a first variable "S" that represents an expected time to transfer data from a first source to a tape drive;
    calculating a second variable "T" that represents an expected time of a sync operation, wherein the second variable is dependent on a current tape speed and a third variable "i" that represents another tape speed, wherein calculating the second variable comprises:
    generating a backhitch time that is dependent on the current tape speed and the third variable, wherein generating the backhitch time comprises calculating:

$\text{Current\_Tape\_Speed}/A + \sqrt{(2*(Y-Z)/A)} + i/A$ where A represents an acceleration, Y represents a position to which deceleration occurs, and Z represents a position to which there is a backward move; and
    dividing an average transaction size by a media transfer rate, wherein the media transfer rate is dependent on the third variable "i"; and
    in response to determining that a value of the first variable is greater than a value of the second variable,
       determining whether there is a slower speed available that is slower than a value of the third variable; and in response to determining that there is no slower speed, outputting the value of the third variable as the tape speed for the sync operation.

11. A computer program product comprising a computer-readable medium including a computer readable program, wherein the computer readable program when executed on a computer causes the computer to:

receive a sync command that writes data in a tape drive data buffer onto a tape cartridge while a backhitch is being performed;

calculate an average transaction size and an average host transfer rate of a set of previous sync operations;

determine the tape speed for the sync operation using the average transaction size, the average host transfer rate, and a backhitch time by calculating:

$$T(i)=\text{Backhitch\_Time}(i)+\text{Average\_Transaction\_Size}/\text{Media\_Transfer\_Rate}(i),$$

wherein the Media_Transfer_Rate(i) is determined based on a density of a tape; and write data to a tape cartridge using the determined tape speed.

12. The computer program product of claim 11, wherein the computer readable program when executed on a computer causes the computer to:

determine an expected time to transfer data from a first source to the tape cartridge one or more times;

determine an expected time of a sync operation one or more times, wherein each determination is based on a particular tape speed from a set of tape speeds; and wherein the tape speed is determined using the one or more determinations of the expected time to transfer data and the one or more determinations of the expected time of the sync operation.

13. The computer program product of claim 11, wherein the determined tape speed avoids a buffer empty condition in a middle of the next sync operation.

14. The computer program product of claim 13, wherein a slower speed is determined for smaller transactions.

15. A computer program product comprising a computer-readable medium including a computer readable program, wherein the computer readable program when executed on a computer causes the computer to:

calculate a first variable "S" that represents an expected time to transfer data from a first source to a tape drive;

calculate a second variable "T" that represents an expected time of a sync operation, wherein the second variable is dependent on a current tape speed and a third variable "i" that represents another tape speed by calculating:

$$T(i)=\text{Backhitch\_Time}(i)+\text{Average\_Transaction\_Size}/\text{Media\_Transfer\_Rate}(i),$$

wherein the Backhitch_Time(i) is dependent on the current tape speed and the third variable "i", and wherein the Media_Transfer_Rate is dependent on the third variable "i"; and in response to determining that a value of the first variable is greater than a value of the second variable, determine whether there is a slower speed available that is slower than a value of the third variable; and in response to determining that there is no slower speed, output the value of the third variable as the tape speed for the sync operation.

16. The computer program product of claim 15, wherein when calculating the first variable, the computer readable program when executed on a computer causes the computer to:

divide an average transaction size by an average host transfer rate.

17. The computer program product of claim 15, wherein the computer readable program when executed on a computer causes the computer to:

in response to determining that there is a slower speed, calculate a new value for the second variable; and compare the new value to the value of the first variable.

18. The computer program product of claim 15, wherein the computer readable program when executed on a computer causes the computer to:

in response to determining that a value of the first variable is less than a value of the second variable, determine whether there is a slower speed available that is slower than a value of the third variable; and in response to determining that there is no slower speed, output the value of the third variable as the tape speed for the sync operation.

19. The computer program product of claim 18, wherein the computer readable program when executed on a computer causes the computer to:

in response to determining that there is a slower speed, set a fourth variable "j" to a value of the slower speed;

calculate a new first value for the second variable "T", wherein the second variable is dependent on a current value of the third variable "i";

calculate a new second value for the second variable "T", wherein the second variable is dependent on the fourth variable "j";

in response to determining that the new first value is less than the new second value, output the current value of the third variable as the tape speed for the sync operation.

20. A computer program product comprising a computer-readable medium including a computer readable program, wherein the computer readable program when executed on a computer causes the computer to:

calculate a first variable "S" that represents an expected time to transfer data from a first source to a tape drive;

calculate a second variable "T" that represents an expected time of a sync operation, wherein the second variable is dependent on a current tape speed and a third variable "i" that represents another tape speed, wherein calculating the second variable comprises:

generating a backhitch time that is dependent on the current tape speed and the third variable, wherein generating the backhitch time comprises calculating:

$$\text{Current\_Tape\_Speed}/A+\sqrt{(2*(Y-Z)/A)}i/A$$

where A represents an acceleration, Y represents a position to which deceleration occurs, and Z represents a position to which there is a backward move; and dividing an average transaction size by a media transfer rate, wherein the media transfer rate is dependent on the third variable "i"; and in response to determining that a value of the first variable is greater than a value of the second variable, determine whether there is a slower speed available that is slower than a value of the third variable; and in response to determining that there is no slower speed, output the value of the third variable as the tape speed for the sync operation.

21. A system for determining a tape speed for a sync operation, comprising:

hardware logic capable of performing operations, the operations comprising:

receiving a sync command that writes data in a tape drive data buffer onto a tape cartridge while a backhitch is being performed;

calculating an average transaction size and an average host transfer rate of a set of previous sync operations;

determining the tape speed for the sync operation using the average transaction size, the average host transfer rate, and a backhitch time by calculating:

$$T(i) = \text{Backhitch\_Time}(i) + \text{Average\_Transaction\_Size} / \text{Media\_Transfer\_Rate}(i),$$

wherein the Media_Transfer_Rate(i) is determined based on a density of a tape; and writing data to a tape cartridge using the determined tape speed.

22. The system of claim 21, wherein operations for determining the tape speed further comprise:

determining an expected time to transfer data from a first source to the tape cartridge one or more times;

determining an expected time of a sync operation one or more times, wherein each determination is based on a particular tape speed from a set of tape speeds; and wherein the tape speed is determined using the one or more determinations of the expected time to transfer data and the one or more determinations of the expected time of the sync operation.

23. The system of claim 21, wherein the determined tape speed avoids a buffer empty condition in a middle of the next sync operation.

24. The system of claim 23, wherein a slower speed is determined for smaller transactions.

25. A system for determining a tape speed for a sync operation, comprising:

hardware logic capable of performing operations, the operations comprising:

calculating a first variable "S" that represents an expected time to transfer data from a first source to a tape drive;

calculating a second variable "T" that represents an expected time of a sync operation, wherein the second variable is dependent on a current tape speed and a third variable "i" that represents another tape speed by calculating:

$$T(i) = \text{Backhitch\_Timed}(i) + \text{Average\_Transaction\_Size} / \text{Media\_Transfer\_Rate}(i),$$

wherein the Backhitch_Time(i) is dependent on the current tape speed and the third variable "i", and wherein the Media_Transfer_Rate is dependent on the third variable "i"; and in response to determining that a value of the first variable is greater than a value of the second variable, determining whether there is a slower speed available that is slower than a value of the third variable; and in response to determining that there is no slower speed, outputting the value of the third variable as the tape speed for the sync operation.

26. The system of claim 25, wherein operations for calculating the first variable further comprise:

dividing an average transaction size by an average host transfer rate.

27. The system of claim 25, wherein the operations further comprise:

in response to determining that there is a slower speed, calculating a new value for the second variable; and comparing the new value to the value of the first variable.

28. The system of claim 25, wherein the operations further comprise:

in response to determining that a value of the first variable is less than a value of the second variable, determining whether there is a slower speed available that is slower than a value of the third variable; and in response to determining that there is no slower speed, outputting the value of the third variable as the tape speed for the sync operation.

29. The system of claim 28, wherein the operations further comprise:

in response to determining that there is a slower speed, setting a fourth variable "j" to a value of the slower speed;

calculating a new first value for the second variable "T", wherein the second variable is dependent on a current value of the third variable "i";

calculating a new second value for the second variable "T", wherein the second variable is dependent on the fourth variable "j";

in response to determining that the new first value is less than the new second value, outputting the current value of the third variable as the tape speed for the sync operation.

30. A system for determining a tape speed for a sync operation, comprising:

hardware logic capable of performing operations, the operations comprising:

calculating a first variable "S" that represents an expected time to transfer data from a first source to a tape drive;

calculating a second variable "T" that represents an expected time of a sync operation, wherein the second variable is dependent on a current tape speed and a third variable "i" that represents another tape speed, wherein operations for calculating the second variable comprises:

generating a backhitch time that is dependent on the current tape speed and the third variable, wherein operations for generating the backhitch time further comprises calculating:

$$\text{Current\_Tape\_Speed}/A + \sqrt{(2*(Y-Z)/A)} + i/A$$

where A represents an acceleration, Y represents a position to which deceleration occurs, and Z represents a position to which there is a backward move and dividing an average transaction size by a media transfer rate, wherein the media transfer rate is dependent on the third variable "i" and in response to determining that a value of the first variable is greater than a value of the second variable, determining whether there is a slower speed available that is slower than a value of the third variable; and in response to determining that there is no slower speed, outputting the value of the third variable as the tape speed for the sync operation.

* * * * *